United States Patent [19]

Tucchio et al.

[11] Patent Number: 5,478,058
[45] Date of Patent: Dec. 26, 1995

[54] SHOCK ISOLATION METHOD AND APPARATUS

[75] Inventors: Michael A. Tucchio, East Lyme; Robert A. Lafreniere, Groton, both of Conn.

[73] Assignee: The United States of America as represented by the Secretary of the Navy, Washington, D.C.

[21] Appl. No.: 236,856

[22] Filed: May 2, 1994

[51] Int. Cl.⁶ .................................................. F16M 1/00
[52] U.S. Cl. ........................ 267/136; 248/633; 188/372; 267/153
[58] Field of Search ................... 188/268, 371, 188/372, 378; 267/136, 139, 140, 151, 153; 248/621, 633, 634; 52/167.3, 167.4

[56] References Cited

U.S. PATENT DOCUMENTS

| | | | |
|---|---|---|---|
| 943,709 | 12/1909 | Sherwood | 248/621 |
| 2,439,739 | 4/1948 | Hussman | 248/621 |
| 3,130,964 | 4/1964 | Johnson | 248/621 |
| 3,460,786 | 8/1969 | Rivin | 248/634 |
| 3,752,462 | 8/1973 | Wight, Jr. | 267/140 |
| 3,795,419 | 3/1974 | Niemkiewicz et al. | 267/140 |
| 3,814,470 | 6/1974 | Kicher et al. | 267/139 |
| 3,857,596 | 12/1974 | Nakamura et al. | 267/140 |
| 4,707,956 | 11/1984 | Sato | 52/167.4 |

*Primary Examiner*—Robert J. Oberleitner
*Assistant Examiner*—Chris Schwartz
*Attorney, Agent, or Firm*—Michael J. McGowan; James M. Kasischke; Prithvi C. Lall

[57] ABSTRACT

A shock isolation device for supporting the weight of an object and providing shock and isolation vibration is disclosed which includes a compressible elastomeric material. Apertures are drilled in the compressible elastomeric material for receiving buckling fibers. The buckling fibers are supported in the respective apertures by a buckling support plate positioned on a bottom surface of the compressible elastomeric material. The fibers extend above the top surface of the compressible elastomeric material to support an object above the top surface under normal conditions when no shocks occur. When a shock occurs, the buckling fibers are elastically or plastically buckled under an applied force caused by acceleration of the object and the object contacts the compressible elastomeric material to isolate the shock. A plurality of the buckling fibers are spaced evenly throughout the elastomeric material to support objects of different sizes and weights.

15 Claims, 1 Drawing Sheet

5,478,058

SHOCK ISOLATION METHOD AND APPARATUS

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field Of The Invention

This invention relates to the use of foams for shock isolation of equipment and, in particular, to a foam having fibers to prevent the viscoelastic or viscoplastic behavior of the foam.

(2) Description of the Prior Art

Foams are commonly used for shock isolation when transporting equipment, such as on a submarine or surface ship. The environment on a ship or other such vehicle can be damaging to certain systems and/or components which must be transported. In the past, foam padding has been used to provide resistance to the shock and vibration thereby preventing damage to the equipment. However, the weight of a component or piece of equipment supported by the foam padding can cause excessive compression of the foam and reduce the resiliency of the foam, thus reducing its effectiveness as a shock and vibration isolator.

In the prior art, different types of foams were used based on the weight of the equipment to allow the foam to support heavier loads without damaging the foam. One problem with using different types of foams is that a foam which is capable of supporting a greater weight without excessive compression does not deform as easily and offers less shock protection.

Another prior art shock isolation device is disclosed in U.S. Pat. No. 3,283,988 to Hardigg and includes a foam cushioning having a stiff, flexible tube embedded therein. In this shock isolation device, however, the stiff, flexible tubes are flush with the top surface of the foam so that the weight of an object supported by the device will still be resting on the foam. Also, the manufacturing of the prior art shock isolation device is disadvantageous in that the flexible tubes must be embedded in the cushioning material.

Hardigg has several deficiencies when it is used in an application incorporating heavy objects subjected to cyclical loading. One problem is the size of column members needed in Hardigg to support heavy objects. Another problem with the column members of Hardigg is the tendency of an elastomer to heat and melt when subjected to numerous cyclical loadings. Forming the column members within the foam as taught by Hardigg creates problems because the column members tend to separate from the foam on buckling thereby damaging the foam. If the area of foam around the column members is damaged then in a critical loading situation, the foam cannot act to adequately support the columns. Furthermore, if the column members are damaged then the entire element must be replaced. Cyclic loading of the foam in Hardigg can damage the cell structure of the elastomeric padding thereby reducing its cushioning when critical accelerations occur.

SUMMARY OF THE INVENTION

Accordingly, it is a general purpose and object of the present invention to provide an apparatus for isolating equipment from mechanical shocks.

It is a further object that such device withstand cyclical loadings without loss of resiliency.

Another object is that such device be easily modified for varying loads.

The present invention is differentiated over the prior art in that the buckling members are steel and therefore achieve a higher yield strength. This provides a greater resistance to acceleration in a smaller area with steel buckling members because of the yield strength of the steel. During buckling, steel will not bend as much as an elastomer, thermoset plastics, or composites. These non-metallic members which can be brittle and catastrophically collapse when subjected to compression beyond their elastic zone or subject to plastic deformation and melting caused by numerous cyclical loadings. Steel buckling members bend plastically when stressed beyond the elastic zone.

The buckling members of the present invention are disposed in apertures formed in an elastomer. Space is provided between the buckling member and the wall of the aperture to reduce damage to the interior of the aperture. In the prior art, stress induced buckling causes friction, tearing and wear to the elastomeric pad and widening of the interior of the aperture.

In the invention herein, the buckling members are fastened to the backing material and will not be pushed out of the elastomer when support is not uniform. Because of the fixed nature of the buckling members, the stress equation incorporates elements of the equation for a fixed-pinned column. Buckling members can be easily replaced and different sets of buckling members can be provided for different objects. If shock loading occurs which places the buckling members in the plastic zone, then buckling members can be replaced.

Another advantage of the present invention is that the buckling members initially contact the object to be supported, therefore more damping can occur before elastomeric padding enters the viscoplastic region. Elastomeric padding is not subjected to numerous stressings and unstressings during vibrational loadings, and elastomeric padding structure remains intact. Long term vibrational loadings can damage the cell structure of the elastomeric padding thereby reducing its cushioning when critical accelerations occur.

The present invention is directed to a shock isolation device for supporting the weight of an object and providing shock and vibration isolation. The shock isolation device of the present invention includes a compressible elastomeric material having a predetermined thickness and a top and bottom surface. In the preferred embodiment, the compressible elastomeric material is foam. A plurality of buckling member regions are disposed in the compressible elastomeric material, extending from the top surface to the bottom surface. In the preferred embodiment, the buckling regions are holes drilled in the compressible elastomeric material or foam.

The shock isolation device of the present invention also includes a plurality of buckling members, one buckling member positioned in each buckling member region for supporting the object above the top surface and for elastically buckling under an applied force caused by acceleration of the object. In the preferred embodiment, the buckling members are fibers having a predetermined diameter and length. Each fiber is inserted in an aperture in the compressible elastomeric material so that one end of the fiber extends beyond the top surface of the compressible elastomeric material to support the object above the top surface when the fiber is not elastically buckled. In the preferred embodiment, the predetermined diameter of the aperture is larger than the predetermined diameter of the fiber to allow for the fiber to deflect or buckle when the load being supported is accelerated. This also allows the support fiber to be changed to accommodate different loads without changing the foam.

The shock isolation device of the present invention further includes a buckling member support plate proximate the bottom surface of the compressible elastomeric material, for positioning and securing the elastic buckling fibers in the corresponding elastic buckling holes. Each fiber is attached to the positioning plate and the positioning plate is attached to the bottom surface of the elastomeric material. The attachment can be achieved by either gluing the materials together or by surface friction. The positioning plate can be glued to the bottom surface of the elastomeric material, or the user can depend upon surface friction between the positioning plate and the elastomeric material. In the preferred embodiment, the positioning plate is a light weight plastic.

When using the shock isolation device of the present invention to support an object, a plurality of support fibers are spaced generally evenly throughout the elastomeric material in a corresponding plurality of holes. The fibers can be positioned such that the center of gravity of the object to be supported is symmetrically balanced.

BRIEF DESCRIPTION OF THE DRAWINGS

These, and other features and advantages of the present invention will be better understood in view of the following detailed description of the invention, taken together with the drawings wherein.

DESCRIPTION OF THE PREFERRED EMBODIMENT

Figure 1A:
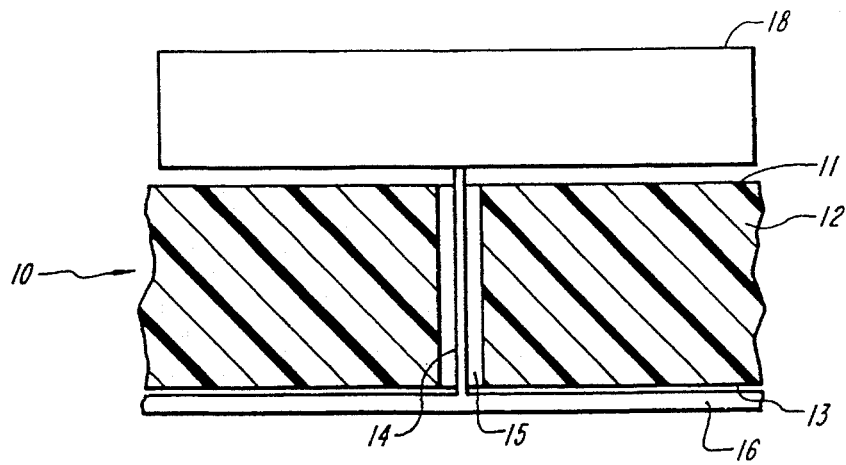
FIG. 1A is a cut-away view of the shock isolation device according to the invention having a support fiber under normal conditions.
Figure 1B:
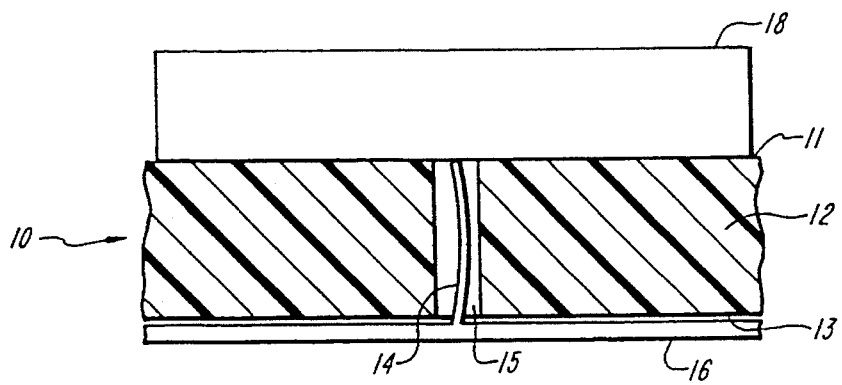
FIG. 1B is a cut-away view of the shock isolation device according to the invention having a support fiber under elastic buckling conditions.

The shock isolation device 10, FIGS. 1A and 1B, according to the present invention includes a compressible, elastomeric material 12. Preferably, the elastomeric material is a foam, but other elastomeric materials used for shock isolation of equipment are contemplated. Elastomeric material 12 can be any elastomer such as Neoprene, natural rubber or the like with the stiffness of the elastomer selected to provide the necessary shock isolation.

If the object is symmetric, then symmetric spacing diameter of apertures 15 should be approximately 10–25 percent of the thickness of elastomeric material 12. This will allow sufficient room for elastic buckling of fiber 14 without binding with or damage to the interior of aperture 15. Aperture 15 diameter and fiber 14 length are both dependent upon the critical load desired and the materials used.

The compressible, elastomeric material 12 is provided with apertures 15 having a predetermined diameter and spaced generally uniformly throughout the elastomeric material 12. The hole spacing is a function of the geometry to be supported. If the object is symmetric, symmetrtic spacing is preferred.

In the preferred embodiment, the support apertures 15 are drilled in the elastomeric material 12. The elastomeric material or foam 12 also has a predetermined thickness and elasticity which is determined according to the weight of the object to be supported and the anticipated shocks and vibrations. Typically, the foam thickness is in the range of ½ to 2 inches.

Elastic buckling fibers 14 are provided to support the object 18 above the top surface 11 of the elastomeric material 12. The fibers 14 extend through the aperture 15 from a positioning plate 16 positioned proximate the bottom surface 13 of the elastomeric material 12. The fibers 14 extend beyond the top surface 11 so that a clearance exists between the object 18 and the top surface 11. Each fiber 14 also has a predetermined diameter which is smaller than the predetermined diameter of the support hole 15 to allow the fiber 14 to elastically buckle when a shock occurs.

Diameter of apertures 15 should be approximately 10–25 percent of the thickness of elastomeric material 12. This will allow sufficient room for elastic buckling of fiber 14 without binding with or damage to the interior of aperture 15. Aperture 15 diameter and fiber 14 length are both dependent upon the critical load desired and the materials used. The diameter of the hole can be approximately 20–25 percent of the fiber length. In the preferred embodiment, the fibers 14 are made of steel, but other flexible materials such as aluminum and fiberglass or the like that are capable of elastically buckling are contemplated within the scope of the invention.

Each support fiber 14 must be designed and the number of fibers must be calculated according to the weight of the object 18 to be supported. The length, diameter and material of the fiber are selected so that the fiber supports the object 18 above the top surface 11 of the foam 12 under normal conditions when the object 18 is not accelerated and, when the object 18 is accelerated, the fiber 14 buckles without yielding allowing the object 18 to come into contact with the foam 12. Each fiber 14 is assumed to act as a fixed-pinned beam and according to linear buckling theory, the critical load represents the minimum load required to linearly buckle the fiber. The critical load Pcr is determined by the equation:

$$P_{cr} = \frac{\pi^2 EI}{(.7L)^2} \tag{1}$$

where:

E=The Young's Modulus of the fiber material.

I=The moment of inertia of a fiber.

L=Fiber length.

The load, however, cannot be increased to the point of causing plastic deformation in the fiber. Thus, the stress on each fiber must be less than the yield stress $\sigma_y$ for the material of the fiber. Therefore, the shock isolation device must be designed so that the load required to achieve elastic buckling of the fiber must lie within these minimum and maximum bounds, as indicated by the following equation:

$$\frac{(20.142)EI}{L^2} \leq P_a \leq \sigma_y A \tag{2}$$

where:

$P_a$=The normal load; and

A=The cross-sectional area of the fibers.

Another design requirement is that the static deflection of the fibers when supporting an object under normal conditions must be less than the clearance between the top of the elastomeric material and the object. The deflection 6 of a support fiber subject to an axial load applied at one end is determined by the following equation:

$$\delta = \frac{PL}{EA} \quad (3)$$

If the fibers have a circular cross section then the necessary number of fibers for adequate support can be calculated. Other necessary information for this calculation includes weight of the object, the possible acceleration applied to the object, the fiber diameter and length, and the fiber material. Since the total load $P_{cr}$ is averaged out over all of the fibers, each fiber must bear an average load such that:

$$P_{cr} = \frac{W\alpha}{N_f} \quad (4)$$

where:
$N_f$=Number of fibers.
W=Weight of the object.
α=Acceleration of the object (in G's).
Equation (1) can then be solved to determine the number of fibers $N_f$:

$$N_f = \frac{W\alpha(.7L)^2}{2\pi EI} \quad (5)$$

Thus, if the object weighs 25 pounds; the object is subject to an acceleration of 2 G's; the support fibers are mild steel (E =3×10$^7$ PSI), 1/64 inch diameter; and the fiber length is assumed to be fixed at 1.6 inches, the number of fibers required is calculated to be 73.

Using 73 fibers to support the object will result in elastic buckling when the acceleration of the object exceeds 2 G's. As a result of the above design of the support fibers, the fibers will buckle elastically and contact the side of the foam when an object such as a piece of equipment is accelerated, and the foam will isolate the shock of the object. When the acceleration terminates, the fibers will support the normal load of the component above the top surface of the foam. The fibers of the shock isolation device will also provide vibration isolation of the object under the normal operating conditions when the object is not accelerated. When there are N fibers the effective stiffness $K_{eff}$ of the fibers is:

$$K_{eff} = \frac{N_f EA}{L} \quad (6)$$

and the fundamental frequency ω of the object/fiber system is:

$$\omega = \sqrt{\frac{N_f AEG}{WL}} \quad (7)$$

Figure 2:
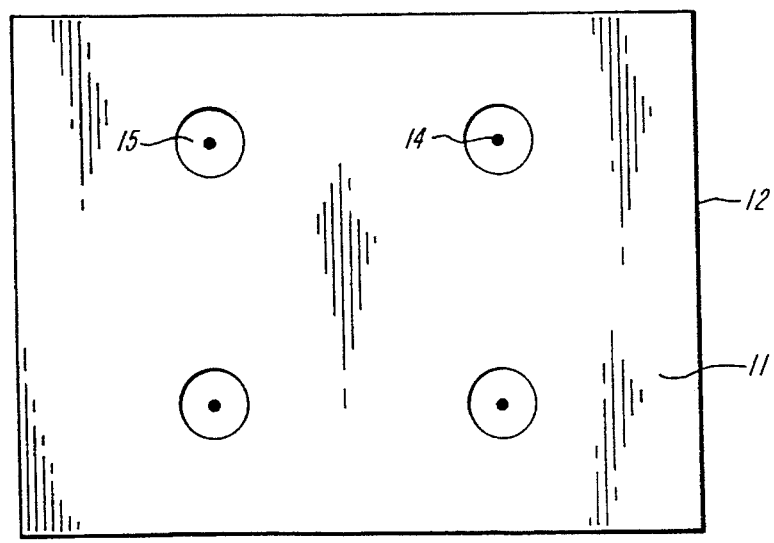
FIG. 2 is a top view of a shock isolation device according to the present invention illustrating a plurality of support fibers.

The elastic buckling support fibers 14 are positioned and held in the support apertures 15 by fixing the support positioning plate 16 to the bottom surface 13 of the elastomeric material 12. The plate 16 in which the fibers 14 are embedded can be bolted to a mounting surface and the elastomeric material 12 rests on top of the plate 16. The support fibers 14 are attached to the positioning plate 16 by a single plate for each set of fibers. The plurality of support apertures 15 and support fibers 14 are spaced evenly throughout the elastomeric material 12, as shown in FIG. 2, so that objects of various sizes can be supported on the shock isolation device.

Modifications and substitutions by one of ordinary skill in the art are considered to be within the scope of the present invention which is not to be limited accept by the claims which follow.

In light of the above, it is therefore understood that within the scope of the appended claims, the invention may be practiced otherwise than as specifically described.

What is claimed is:

1. A shock isolation device for supporting the weight of an object and providing shock and vibration isolation, comprising:

a compressible elastomeric material of a predetermined thickness, said compressible elastomeric material having a top surface and a bottom surface and having at least one buckling region disposed in said compressible elastomeric material extending generally from said top surface to said bottom surface of said elastomeric material;

at least one buckling member positioned in said at least one buckling region, for supporting said object above said top surface of said compressible elastomeric material, and for buckling elastically under an applied force caused by a predetermined acceleration of said object, said at least one buckling member having a first end extending beyond said top surface of said elastomeric material, said first end of said at least one buckling member adapted to support said object above said top surface of said compressible elastomeric material, said object supported only by said buckling member and only in a direction parallel to the length of the buckling member when said at least one buckling member is not elastically buckled; and a buckling support means proximate said bottom surface of said compressible elastomeric material for positioning said at least one buckling member in said at least one buckling region.

2. The shock isolation device of claim 1 wherein said buckling region is an aperture in said compressible elastomeric material having a predetermined diameter.

3. The shock isolation device of claim 2 wherein said buckling member comprises a fiber having a predetermined diameter, said fiber being inserted in said aperture in said compressible elastomeric material and having a second end attached to said buckling support means.

4. The shock isolation device of claim 3 further comprising a plurality of fibers in a plurality of said apertures evenly spaced in said compressible elastomeric material, each said fiber being inserted in a corresponding hole in said compressible elastomeric material.

5. The shock isolation device of claim 3 wherein said predetermined diameter of said aperture is larger than said predetermined diameter of said fiber.

6. The shock isolation device of claim 1 wherein said buckling support means comprises a rigid plate attached to said bottom surface of said compressible elastomeric material.

7. The shock isolation device of claim 1 wherein said compressible elastomeric material is foam.

8. The shock isolation device of claim 3 wherein said fiber are made of steel.

9. A method of making a shock isolating device for supporting the weight of an object and for providing shock and vibration isolation, comprising the steps of:

providing a compressible elastomeric material of a predetermined thickness, said compressible elastomeric material having a top surface and a bottom surface;

forming at least one buckling region in said compressible elastomeric material extending generally from said top surface to said bottom surface;

positioning a buckling support means proximate said bottom surface of said compressible elastomeric material; and positioning at least one buckling member attached to said buckling support means in a corresponding said at least one buckling region, said at least one buckling member being positioned such that one end of said at least one buckling member extends beyond said top surface of said compressible elastomeric material;

supporting said object only by said buckling member and only in a direction parallel to the length of the buckling member when said at least one buckling member is not elastically buckled.

10. The method of claim 9 further comprising the step of placing said object on said one end of said at least one buckling member.

11. The method of claim 9 further comprising the step of molding said at least one buckling member to said buckling support means.

12. The method of claim 9 wherein said step of forming said at least one buckling region comprises drilling at least one aperture in said compressible elastomeric material.

13. The method of claim 12 wherein said at least one buckling member includes at least one fiber and further comprises the step of inserting said at least one fiber in a corresponding said at least one aperture.

14. The method of claim 13 wherein said at least one fiber is molded to said buckling support means.

15. The method of claim 9 wherein said buckling support means is attached to said bottom surface of said compressible elastomeric material.

* * * * *